June 5, 1923.                                                    1,457,381
A. H. MIDGLEY
DYNAMO ELECTRIC MACHINE
Filed April 3, 1922
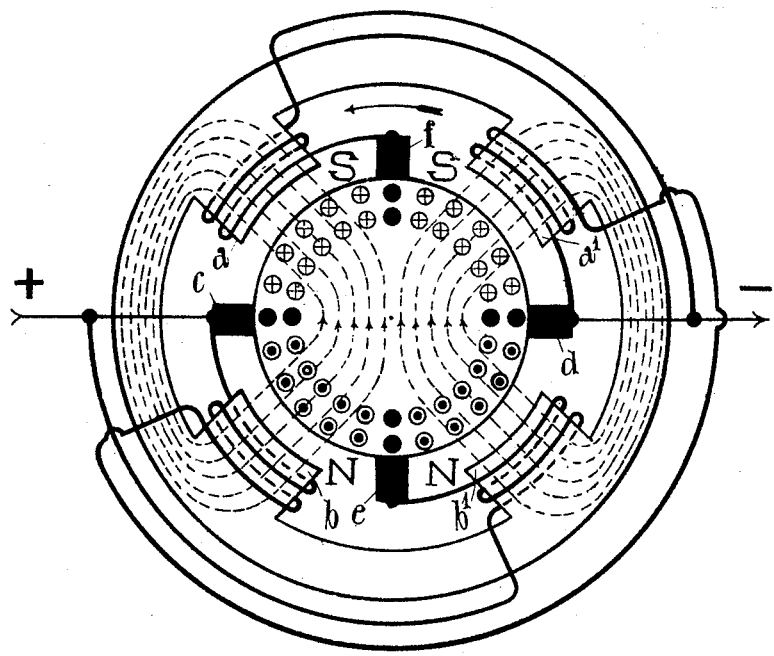
Inventor
A. H. Midgley,
By Marks & Clerk
Attys.

Patented June 5, 1923.

1,457,381

UNITED STATES PATENT OFFICE.

ALBERT HENRY MIDGLEY, OF UXBRIDGE, ENGLAND.

DYNAMO-ELECTRIC MACHINE.

Application filed April 3, 1922. Serial No. 549,326.

*To all whom it may concern:*

Be it known that I, ALBERT HENRY MIDGLEY, a subject of the King of Great Britain and Ireland, and residing at Fairfield, Harefield Road, Uxbridge, in the county of Middlesex, England, have invented certain new and useful Improvements in Dynamo-Electric Machines, of which the following is a specification.

This invention relates to dynamo electric machines of the type in which means are provided for maintaining the output of the machine constant for varying speeds of rotation, such machines being especially suitable, for example, for train lighting or for use on motor vehicles, motor boats, and in other situations where a constant output for varying speeds is necessary or desirable.

Hitherto the self-regulation of machines of this type has generally been obtained by the use of a third brush, between which and one main brush the field winding is connected so that as the field is distorted by the armature current, the voltage between these two brushes diminishes with the result that the field current is reduced and the output is maintained constant.

In all such types of machines which rely on distortion of the field to obtain self-regulation the armature coils short-circuited by the third brush are in a relatively strong field and as the field current is reduced the distortion of the field increases and the armature coils short-circuited by the main brushes are also in a relatively strong field of reverse polarity with the result that commutation is very bad particularly at high speeds.

The object of the present invention is to provide for the self-regulation of dynamo electric machines without the disadvantages noted above and the invention consists in a dynamo electric machine having a field provided with a subdivided pole or poles characterised by the feature that the leading part of the subdivided pole (that is the part of the pole which the armature conductors reach first in rotating) is supplied with current at approximately constant voltage while the trailing part (that is the part of the pole which the armature conductors reach last in rotating) is supplied with current from the conductors lying under the pole face of the leading part, with the result that perfect regulation with sparkless commutation will be obtained.

The invention also consists in the form of machine hereinafter described or indicated.

The accompanying drawing illustrates diagrammatically one form of machine in accordance with the invention.

In carrying my invention into effect in one convenient manner as, for example, in its application to a two-pole dynamo of which the armature is of the two-pole diametrically wound type connected to the commutator in the usual manner, I arrange that instead of employing the usual two poles only of the field magnet, each pole is divided into two so that there are thus four poles $a$, $a'$, $b$, $b'$ of which one pair (say, for example, the upper $a$, $a'$) are of like polarity while the other pair, $b$, $b'$, are of the opposite polarity and each pole is provided with a separate field coil.

The commutator is provided with two main brushes $c$, $d$, and two field brushes $e$, $f$, the armature coils short-circuited by these brushes being in a neutral position approximately midway between the pole tips.

Assuming that the machine is to run in an anti-clockwise direction (as shown by the arrow) when viewing it from the commutator end I arrange the main brushes $c$, $d$, to be situated in the horizontal plane and the field brushes $e$, $f$, in the vertical plane and the field coils will be connected as follows:—

The coil on the upper left-hand pole $a$ is connected between the right-hand main brush $d$ and the upper field brush $f$, the field coil on the lower right-hand pole $b'$ is connected between the left-hand main brush $c$ and the lower field brush $e$ and the field coils on the upper right-hand pole $a'$ and the lower left-hand pole $b$ are connected across the two main brushes $c$, $d$.

For convenience of reference I will term the poles connected between the main brushes and the field brushes the regulating field and the poles connected across the main brushes I will term the main field. It will then be noted that the strength of the regulating field is dependent upon the voltage generated in the armature coils under the poles of the main field so that any tendency of the armature current to oppose the main field produces a diminishing voltage across the regulating field coils, thereby reducing the regulating field until at a certain point it becomes zero, whereupon for increase of speed the direction of the regulating field is reversed and opposes the field produced by the armature coils under the main poles. The result of the arrangement described is thus to provide for the efficient self-regulation of the machine for the purpose of maintaining the output substantially constant independent of the speed of rotation, while the armature coils short-circuited by the brushes during such self-regulation are in a practically neutral field and substantially sparkless commutation is thus secured.

It will be understood that the invention is not to be confined to the application hereinbefore given nor to the details of construction hereinbefore described since these are given by way of illustration and not of limitation, but it will be obvious that the invention may be applied with equal effect and like advantage to multi-polar machines having any known type of armature winding, and I may modify the subdivision of each pole, the number and arrangement of brushes and the method of connection of the various circuits as may be determined by the type and construction of machine to which the invention is to be applied or any practical requirements that may have to be fulfilled.

Having now described my invention, what I claim as new and desire to secure by Letters Patent is:—

1. A dynamo electric machine having one of its field poles sub-divided circumferentially, means for exciting the leading part of said pole from an approximately constant voltage, and the trailing part of the pole being excited from the armature conductors lying under the pole face of the leading part.

2. A dynamo electric machine having each of its field poles subdivided circumferentially, means for exciting the leading part of each pole from an approximately constant voltage, and the trailing part of each pole being excited from the armature conductors lying under the pole face of the leading part.

In testimony whereof I have signed my name to this specification.

ALBERT HENRY MIDGLEY.